US012596357B2

(12) United States Patent
Zhou et al.

(10) Patent No.: US 12,596,357 B2
(45) Date of Patent: Apr. 7, 2026

(54) AUTOMATED PRODUCTION PLAN GENERATION SYSTEM

(71) Applicant: Kabushiki Kaisha Toshiba, Tokyo (JP)

(72) Inventors: Xinyi Zhou, Yokohama Kanagawa (JP); Masaya Takaki, Yokohama Kanagawa (JP); Naomi Sugiyama, Kamakura Kanagawa (JP); Sayaka Shinji, Yokohama Kanagawa (JP); Kazuhiro Oka, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 312 days.

(21) Appl. No.: 18/168,822

(22) Filed: Feb. 14, 2023

(65) Prior Publication Data

US 2023/0305539 A1 Sep. 28, 2023

(30) Foreign Application Priority Data

Mar. 23, 2022 (JP) ................................ 2022-046833

(51) Int. Cl.
*G05B 19/418* (2006.01)

(52) U.S. Cl.
CPC ... *G05B 19/41865* (2013.01); *G05B 19/4184* (2013.01)

(58) Field of Classification Search
None
See application file for complete search history.

(56) References Cited

U.S. PATENT DOCUMENTS

| | | | | |
|---|---|---|---|---|
| 5,586,021 A | * | 12/1996 | Fargher | .............. G06Q 10/0631 700/121 |
| 6,611,727 B2 | * | 8/2003 | Bickley | .................. G06Q 10/06 700/99 |
| 11,556,119 B2 | * | 1/2023 | Shi | ................... G05B 19/41865 |
| 2003/0149503 A1 | | 8/2003 | Kawase et al. | |

(Continued)

FOREIGN PATENT DOCUMENTS

| | | |
|---|---|---|
| JP | 2003-228410 A | 8/2003 |
| JP | 2009-237965 | 10/2009 |

(Continued)

OTHER PUBLICATIONS

Office Action received in Korean Application No. 10-2023-0015900, dated Jun. 20, 2024.

(Continued)

*Primary Examiner* — Ariel Mercado-Vargas
(74) *Attorney, Agent, or Firm* — Knobbe, Martens, Olson & Bear, LLP

(57) ABSTRACT

According to one embodiment, a generation system generates a production plan. The production plan is for producing products of product types by processes using production lines. The system includes an optimization calculation part, an input plan generator, and a verification part. The optimization calculation part generates a processing plan by an optimization calculation using first input data. The first input data includes a production plan amount of each of the product types and a processing capacity of each equipment. The input plan generator generates an input plan by using second input data. The second input data includes an input amount of workpieces to each of the production lines for each of the product types. The second input data further includes a processing route in the plurality of processes for each of the product types. The verification part determines an appropriateness of the processing plan and the input plan.

7 Claims, 22 Drawing Sheets

(56)  References Cited

U.S. PATENT DOCUMENTS

| | | | | |
|---|---|---|---|---|
| 2005/0228521 | A1* | 10/2005 | Nomoto | G06Q 10/04 |
| | | | | 700/103 |
| 2006/0106477 | A1* | 5/2006 | Miyashita | G05B 19/41885 |
| | | | | 700/103 |
| 2007/0168067 | A1 | 7/2007 | Yaji et al. | |
| 2010/0249970 | A1* | 9/2010 | Koike | G05B 19/41865 |
| | | | | 700/100 |
| 2018/0032065 | A1* | 2/2018 | Delgado Arana | |
| | | | | G05B 19/41865 |
| 2020/0159194 | A1* | 5/2020 | Katsumata | G05B 19/4189 |
| 2021/0216931 | A1* | 7/2021 | Urabe | G06Q 10/06313 |
| 2021/0311464 | A1 | 10/2021 | Kajita et al. | |
| 2025/0164974 | A1* | 5/2025 | Nakano | G05B 19/418 |
| 2025/0181060 | A1* | 6/2025 | Amano | G05B 19/418 |

FOREIGN PATENT DOCUMENTS

| | | | |
|---|---|---|---|
| JP | 2010-165283 | A | 7/2010 |
| JP | 2020-086646 | | 6/2020 |
| JP | 2020-098509 | | 6/2020 |
| JP | 2020-181575 | | 11/2020 |
| JP | 2021-163324 | A1 | 10/2021 |
| KR | 10-2006-0105027 | A | 10/2006 |
| KR | 10-2342027 | B1 | 12/2021 |
| KR | 10-2022-0009348 | A | 1/2022 |

OTHER PUBLICATIONS

Office Action issued in Japanese Patent Application No. 2022-046833, dated Jun. 30, 2025 in 10 pages.

* cited by examiner

FIG. 3A

| OPE | GRP | NO | BLOCK |
|------|------|-----|--------|
| OPE1 | GRP1 | 1 | 0 |
| OPE2 | GRP2 | 2 | 1 |
| OPE3 | GRP1 | 3 | 0 |

FIG. 3B

| EQP | OPE | CNT |
|------|------|-----|
| EQP1 | OPE1 | 1 |
| EQP1 | OPE2 | 1 |
| EQP1 | OPE3 | 0 |
| EQP2 | OPE1 | 1 |
| EQP2 | OPE2 | 1 |
| EQP2 | OPE3 | 0 |

FIG. 3C

| ITEM | EQP | OPE | CAPA |
|-------|------|------|------|
| ITEM1 | EQP1 | OPE1 | 20 |
| ITEM1 | EQP2 | OPE1 | 30 |
| ITEM1 | EQP3 | OPE1 | 25 |
| ITEM2 | EQP1 | OPE1 | 0 |
| ITEM2 | EQP2 | OPE1 | 50 |
| ITEM2 | EQP3 | OPE1 | 50 |

FIG. 4A    131      132      133      134      130

| ITEM | EQP | OPE | AVAIL |
|------|------|------|------|
| ITEM1 | EQP1 | OPE1 | 1 |
| ITEM1 | EQP2 | OPE1 | 1 |
| ITEM1 | EQP3 | OPE1 | 0 |
| ITEM2 | EQP1 | OPE1 | 0 |
| ITEM2 | EQP2 | OPE1 | 1 |
| ITEM2 | EQP3 | OPE1 | 1 |

FIG. 4B    141      142      143      140

| ITEM | OPE | DEMAND |
|------|------|------|
| ITEM1 | OPE1 | 40 |
| ITEM1 | OPE2 | 40 |
| ITEM2 | OPE1 | 30 |
| ITEM2 | OPE2 | 30 |

| PRODUCT TYPE | NUMBER OF INPUT LOTS | COLLECTIVE NUMBER OF INPUT LOTS |
|---|---|---|
| 070 | 19 | 1 |
| 690 | 100 | 1 |
| HF45 | 11 | 1 |
| 09X | 18 | 1 |
| MH | 6 | 1 |
| MBS | 9 | 2 |
| FJ | 10 | 2 |
| HTC | 13 | 2 |

| PRODUCT TYPE | PRODUCTION LINE a | PRODUCTION LINE b | PRODUCTION LINE c |
|---|---|---|---|
| 070 | 100% | 0% | 0% |
| 690 | 30% | 70% | 0% |
| HF45 | 100% | 0% | 0% |
| 09X | 0% | 100% | 0% |
| MH | 100% | 0% | 0% |
| MBS | 100% | 0% | 0% |
| FJ | 100% | 0% | 0% |
| HTC | 100% | 0% | 0% |

FIG. 11A

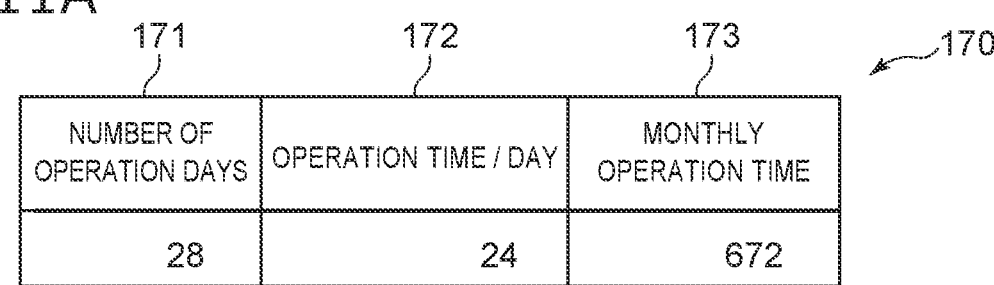

| NUMBER OF OPERATION DAYS | OPERATION TIME / DAY | MONTHLY OPERATION TIME |
|---|---|---|
| 28 | 24 | 672 |

| PRODUCT TYPE | NUMBER OF LOTS | ROUTE | INPUT LINE |
|---|---|---|---|
| 070 | 19 | 1 | PRODUCTION LINE a |
| 690 | 30 | 1 | PRODUCTION LINE a |
| 690 | 20 | 2 | PRODUCTION LINE b |
| 690 | 19 | 3 | PRODUCTION LINE b |
| 690 | 31 | 4 | PRODUCTION LINE b |
| HF45 | 11 | 1 | PRODUCTION LINE a |
| 09X | 18 | 4 | PRODUCTION LINE b |
| MH | 6 | 1 | PRODUCTION LINE a |
| MBS | 9 | 5 | PRODUCTION LINE a |
| FJ | 8 | 5 | PRODUCTION LINE a |
| FJ | 2 | 6 | PRODUCTION LINE a |
| HTC | 11 | 5 | PRODUCTION LINE a |
| HTC | 2 | 6 | PRODUCTION LINE a |

FIG. 12

| PRODUCT TYPE | NUMBER OF INPUTS | |
| --- | --- | --- |
| | PRODUCTION LINE a | PRODUCTION LINE b |
| 070 | 19 | 0 |
| 690 | 30 | 70 |
| HF45 | 11 | 0 |
| 09X | 0 | 18 |
| MH | 6 | 0 |
| MBS | 5 | 0 |
| FJ | 5 | 0 |
| HTC | 7 | 0 |
| TOTAL | 83 | 88 |

FIG. 13

| EXAMPLE) 690 | PRODUCTION LINE a | PRODUCTION LINE b |
| --- | --- | --- |
| TOTAL INPUT AMOUNT OF PRODUCTION LINE | 83 | 88 |
| NUMBER OF INPUTS OF PRODUCT TYPE | 30 | 70 |
| INPUT FREQUENCY | 2.8 | 1.3 |

FIG. 14

| PRODUCT TYPE | INPUT FREQUENCY | COLLECTIVE NUMBER OF LOTS | ROUTE | RANDOM NUMBER 1 |
|---|---|---|---|---|
| 690 | 2.8 | 1 | 2 | 0.40 |
| 690 | 2.8 | 1 | 2 | 0.29 |
| ... | ... | ... | ... | ... |
| 690 | 2.8 | 1 | 3 | 0.74 |
| 690 | 2.8 | 1 | 3 | 0.35 |
| ... | ... | ... | ... | ... |
| 690 | 2.8 | 1 | 4 | 0.04 |
| 690 | 2.8 | 1 | 4 | 0.89 |
| ... | ... | ... | ... | ... |

FIG. 15

| PRODUCT TYPE | INPUT FREQUENCY | COLLECTIVE NUMBER OF LOTS | ROUTE | RANDOM NUMBER 1 |
|---|---|---|---|---|
| 690 | 2.8 | 1 | 4 | 0.04 |
| 690 | 2.8 | 1 | 2 | 0.29 |
| ... | ... | ... | ... | ... |
| 690 | 2.8 | 1 | 3 | 0.35 |
| 690 | 2.8 | 1 | 2 | 0.40 |
| ... | ... | ... | ... | ... |
| 690 | 2.8 | 1 | 3 | 0.74 |
| 690 | 2.8 | 1 | 4 | 0.89 |
| ... | ... | ... | ... | ... |

221    222    223    224    225    226    227    220

| PRODUCT TYPE | INPUT FREQUENCY | COLLECTIVE NUMBER OF LOTS | ROUTE | LOT NO. (NUMBER OF INPUTS) | RANDOM NUMBER 2 | SCORE |
|---|---|---|---|---|---|---|
| 690 | 2.8 | 1 | 1 | 1 | 0.4 | 3.2 |
| 070 | 4.4 | 1 | 1 | 1 | 0.67 | 5.07 |
| 690 | 2.8 | 1 | 1 | 2 | 0.29 | 5.89 |
| HTC | 7.5 | 1 | 5 | 1 | 0.65 | 8.12 |
| HF45 | 7.5 | 1 | 1 | 1 | 0.83 | 8.33 |
| 690 | 2.8 | 1 | 1 | 3 | 0.34 | 8.74 |
| 070 | 4.4 | 1 | 1 | 2 | 0.17 | 8.97 |
| 690 | 2.8 | 1 | 1 | 4 | 0.34 | 11.72 |
| HF45 | 7.5 | 1 | 1 | 2 | 0.77 | 15.77 |
| MBS | 16.6 | 2 | 5 | 1 | 0.18 | 16.78 |
| 070 | 4.4 | 1 | 1 | 3 | 0.28 | 13.48 |
| ... | ... | ... | ... | ... | ... | ... |

FIG. 16

| 228 | 229 | 221 | 222 | 223 | 224 | 220a |
|-----|-----|-----|-----|-----|-----|------|

| No. | INPUT TIMING | PRODUCT TYPE | INPUT FREQUENCY | COLLECTIVE NUMBER OF LOTS | ROUTE |
|-----|--------------|--------------|-----------------|---------------------------|-------|
| 1 | 00:00:00:00 | 690 | 2.8 | 1 | 1 |
| 2 | 00:08:06:00 | 070 | 4.4 | 1 | 1 |
| 3 | 00:16:12:00 | 690 | 2.8 | 1 | 1 |
| 4 | 01:00:18:00 | HTC | 7.5 | 1 | 5 |
| 5 | 01:21:24:00 | HF45 | 7.5 | 1 | 1 |
| 6 | 02:05:30:00 | 690 | 2.8 | 1 | 1 |
| 7 | 02:13:36:00 | 070 | 4.4 | 1 | 1 |
| 8 | 02:21:42:00 | 690 | 2.8 | 1 | 1 |
| 9 | 03:05:48:00 | HF45 | 7.5 | 1 | 1 |
| 10 | 03:13:56:00 | MBS | 16.6 | 2 | 5 |
| 11 | 03:22:02:00 | 070 | 4.4 | 1 | 1 |
| 12 | ... | ... | ... | ... | ... |

FIG. 17

| Variety | ProcID | Number |
|---------|--------|--------|
| test | P1_01 | 1 |
| test | P2_01 | 1 |
| test | P3_01 | 1 |
| test | P4_01 | 1 |

| Variety<br>421 | ProcID<br>422 | ProcName<br>423 | ProcTime<br>424 | Mac<br>425 |
|---|---|---|---|---|
| test | P1_01 | MAIN 1 | 10:00:00 | MAIN |
| test | P1_02 | MAIN 2 | 10:00:00 | MAIN |
| test | P1_03 | MAIN 3 | 10:00:00 | MAIN |
| test | P1_04 | MAIN 4 | 10:00:00 | MAIN |
| test | P1_05 | MAIN 5 | 10:00:00 | MAIN |

| Variety<br>441 | ProcID<br>442 | ProcName<br>443 | PreProcID<br>444 | PreProcName<br>445 |
|---|---|---|---|---|
| test | P1_02 | MAIN 2 | P1_01 | MAIN 1 |
| test | P1_03 | MAIN 3 | P1_02 | MAIN 2 |
| test | P1_04 | MAIN 4 | P1_03 | MAIN 3 |
| test | P1_05 | MAIN 5 | P1_04 | MAIN 4 |
| test | P1_02 | MAIN 2 | P2_01 | SINGLE MERGING 1 |

| Variety | ProcID | ProcName | Resource | Type | Amount |
|---------|--------|----------|----------|------|--------|
| test | P1_02 | MAIN 2 | Worker | TASK A | 1 |
| test | P1_03 | MAIN 3 | Worker | TASK A | 2 |
| test | P1_04 | MAIN 4 | Worker | TASK A | 3 |
| test | P1_05 | MAIN 5 | Worker | TASK A | 2 |
| test | P1_05 | MAIN 5 | Worker | TASK B | 1 |
| test | P1_05 | MAIN 5 | Jig | TASK C | 1 |

| Shift | From | To | Pauses |
|-------|------|-----|--------|
| NORMAL SHIFT | 6:00 | 17:30 | 8:45-9:00,12:00-13:00, 15:15-15:30 |
| 2 h OVERTIME | 6:00 | 20:00 | 9:00-9:15,12:00-13:00, 15:00-15:15,17:30-18:00 |
| WITHIN WORKING HOURS | 6:00 | 20:00 | |

| Name | Shift | TASK A | TASK B | TASK C |
|---|---|---|---|---|
| WORKER 1 | NORMAL SHIFT | 1 | 1 | |
| WORKER 2 | NORMAL SHIFT | 1 | | 1 |
| WORKER 3 | NORMAL SHIFT | 1 | | |
| WORKER 4 | NORMAL SHIFT | 1 | | |
| WORKER 5 | NORMAL SHIFT | 1 | | |
| WORKER 6 | NORMAL SHIFT | | 1 | |

521    522    523    524    525    526    520

| Mac | Number | Capacity | Shift | MTBF | MTTR |
|---|---|---|---|---|---|
| MAIN | 5 | 1 | WITHIN WORKING HOURS | 15:00:00 | 1:00:00 |
| SUB | 3 | 2 | WITHIN WORKING HOURS | 15:00:00 | 1:00:00 |

541    542    543    540

| Name | Number | Shift |
|---|---|---|
| JIG | 6 | WITHIN WORKING HOURS |

AUTOMATED PRODUCTION PLAN GENERATION SYSTEM

CROSS-REFERENCE TO RELATED APPLICATIONS

This application is based upon and claims the benefit of priority from Japanese Patent Application No. 2022-046833, filed on Mar. 23, 2022; the entire contents of which are incorporated herein by reference.

FIELD

Embodiments described herein relate generally to a generation system, a generation method, and a storage medium.

BACKGROUND

There is a system that automatically generates a production plan. Technology of the system that can generate the production plan with higher accuracy is desirable.

BRIEF DESCRIPTION OF THE DRAWINGS

FIGS. 3A to 3C are examples of data utilized to generate a model used in an optimization calculation;

FIGS. 4A and 4B are examples of data utilized to generate a model used in an optimization calculation;

FIGS. 11A and 11B are examples of data used to generate the input plan;

FIG. 12 is data illustrating processing results of the input plan generator;

FIG. 13 is data illustrating processing results of the input plan generator;

FIG. 14 is data illustrating processing results of the input plan generator;

FIG. 15 is data illustrating processing results of the input plan generator;

FIG. 16 is data illustrating processing results of the input plan generator;

FIG. 17 is data illustrating processing results of the input plan generator;

FIG. 20 is an example of data used in the simulation;

FIG. 21 is an example of data used in the simulation;

FIG. 22 is an example of data used in the simulation;

FIG. 23 is an example of data used in the simulation;

DETAILED DESCRIPTION

Figures 1, 2:
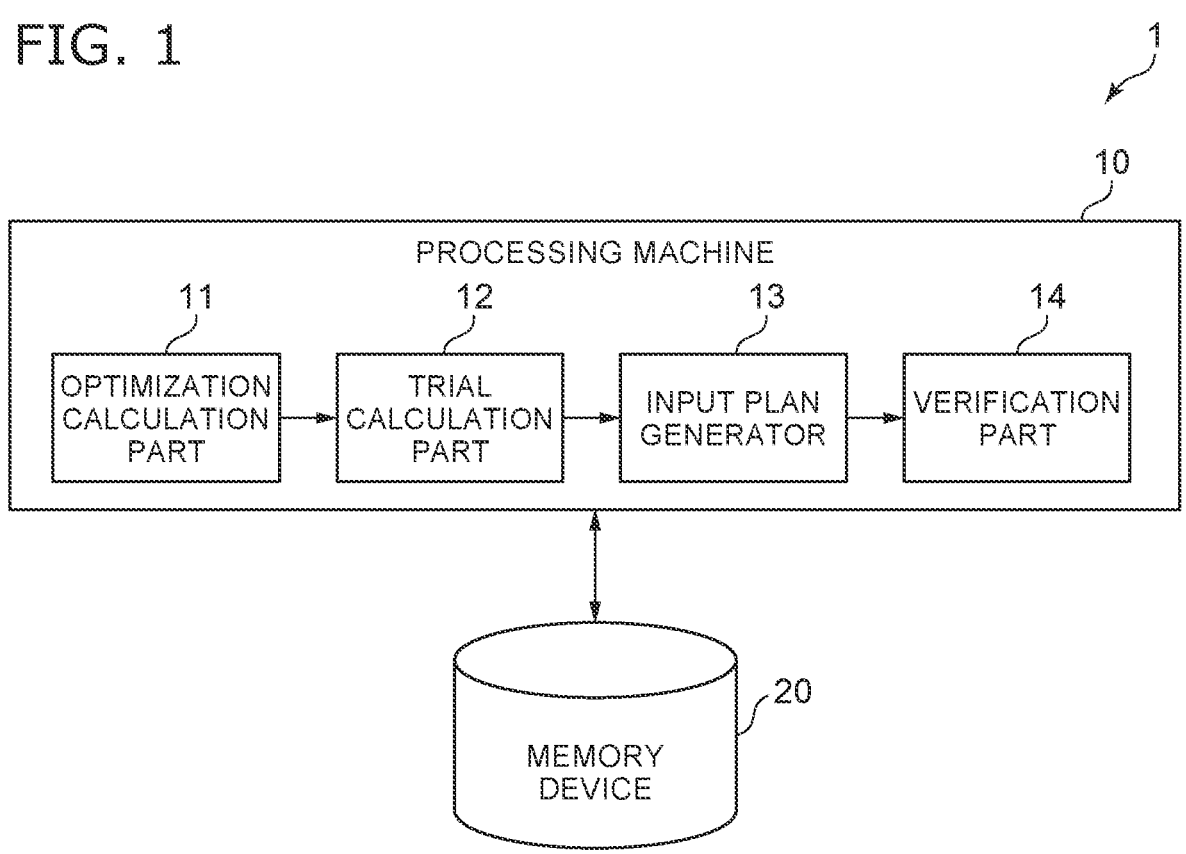
FIG. 1 is a schematic view showing a configuration of a generation system according to an embodiment.
FIG. 2 is a schematic view showing a model using an optimization calculation.

According to one embodiment, a generation system generates a production plan. The production plan is for producing products of a plurality of product types by a plurality of processes using a plurality of production lines. The system includes an optimization calculation part, an input plan generator, and a verification part. The optimization calculation part generates a processing plan by an optimization calculation using first input data. The first input data includes a production plan amount of each of the product types and a processing capacity of each equipment. The optimization calculation includes an objective function and a constraint condition. The processing plan is of a production plan amount for each of the product types, each of the production lines, and each of the processes. The input plan generator generates an input plan by using second input data. The second input data includes an input amount of workpieces to each of the production lines for each of the product types. The second input data further includes a processing route in the plurality of processes for each of the product types. The input plan is of an input timing of the workpieces to the plurality of production lines. The verification part determines an appropriateness of the processing plan and the input plan by a simulation based on the processing plan and the input plan.

Various embodiments are described below with reference to the accompanying drawings. In the specification and drawings, components similar to those described previously or illustrated in an antecedent drawing are marked with like reference numerals, and a detailed description is omitted as appropriate.

An embodiment of the invention relates to a generation system. The generation system generates a production plan. A product is produced according to the production plan.

First, an overview of the production of the product will be described. Multiple products are produced in a production site (a plant, a factory, etc.). Each product is produced by multiple processes. A production line includes a series of multiple processes. The production lines are optimized to efficiently transfer the workpieces between processes. For example, the processing machines of the processes are located proximate to each other to reduce the transfer time of the workpieces. Multiple production lines are located in the production site; and each production line produces products.

Generally, products of multiple product types are produced in the production site. Different product types have different product configurations, structures, or characteristics. The processes necessary for producing the products also are different between the product types. Generally, the multiple production lines are not completely identical and have differences. For example, some production lines include dedicated equipment for specific product types. Some production lines include superior equipment having higher processing capacities than other production lines. High processing capacity is the ability to simultaneously process many workpieces or to process each workpiece in a short period of time.

A production plan is necessary when using multiple production lines to produce products of multiple product types. As described above, differences between the production lines exist, and different processes are necessary for each product type. Therefore, a production plan for efficiently operating each equipment in the production site is generated. The production plan includes data for the production of the product such as which production line to use, which equipment to use, when to produce, etc.

FIG. 1 is a schematic view showing a configuration of a generation system according to an embodiment.

As shown in FIG. 1, the generation system 1 includes a processing machine 10 and a memory device 20. The processing machine 10 functions as an optimization calculation part 11, a trial calculation part 12, an input plan generator 13, and a verification part 14.

The optimization calculation part 11 generates a processing plan for achieving the target production volume of each product type. The processing plan indicates the extent that the workpiece is processed in which processes of which production lines for each product type.

FIG. 2 is a schematic view showing a model using an optimization calculation.

One specific example of the optimization calculation will be described. Formula 1 is used as the objective function. Formulas 2 to 6 are used as constraint conditions. i in Formulas 1 to 6 indicates the product type as shown in FIG. 2. j indicates the resource. The resource is the equipment processing the workpiece in each process and corresponds to the production line. For example, the production line that includes the resource j is different from the production line that includes the resource j+1. k indicates the process.

$d_{ik}$ is the demand amount for the workpiece of the product type i in the kth process. $x_{ijk}$ indicates the usage ratio of the product type i in the resource j in the process k. The usage ratio $x_{ijk}$ indicates the ratio of the number of workpieces processed by each resource to the demand amount $d_{ik}$. $y_{ijk}$ indicates an allocation ratio of the workpieces of the product type i processed by each resource j in the process k. $s_{ijk}$ indicates the processing capacity of the resource j in the process k for the product type i. The maximum number of workpieces of the product type i that can be processed by the resource j alone is set as the processing capacity $s_{ijk}$. n is the upper limit of the total of the usage ratios that can be processed by the resource j in the process k, and means the number of available resources. $z_{ijk}$ indicates the allocation ratio difference between the process k and the process k+1 for the resource j processing the workpieces of the product type i, and corresponds to the number of transfers. The allocation ratio difference $z_{ijk}$ between processes is represented by Formula 7. Input data (first input data) that includes the demand amount $d_{ik}$, the product type i, the resource j, the process k, the processing capacity $s_{ijk}$, and the transfer constraint $b_k$ is prepared beforehand by a user.

$$\min \sum_i \sum_j \sum_k \frac{d_{ik+1} z_{ijk}}{2} \qquad \text{[Formula 1]}$$

-continued $$-z_{ijk} \le y_{ijk} - y_{ijk+1} \le z_{ijk} \qquad \text{[Formula 2]}$$

$$z_{ijk} \cdot b_k = 0 \qquad \text{[Formula 3]}$$

$$\sum_j s_{ijk} x_{ijk} \ge d_{ik} \qquad \text{[Formula 4]}$$

$$\sum_{k \in g(k)} \sum_i x_{ijk} \le \sum_{k \in g(k)} n_{jk} \qquad \text{[Formula 5]}$$

$$x_{ijk} \ge 0 \qquad \text{[Formula 6]}$$

$$z_{ijk} = \begin{cases} y_{ijk} - y_{ijk+l+1} & (d_{ik} > 0 \wedge d_{ik+l+1} > 0) \\ 0 & (\text{otherwise}) \end{cases} \qquad \text{[Formula 7]}$$

Formula 1 shows that the objective is to minimize the number of transfers between production lines. Formula 2 shows that the allocation ratio difference of the processes before and after is not less than 0, and corresponds to the formula for expressing "$z_{ijk} = |y_{ijk} - y_{ijk+1}|$". In Formula 3, $b_k$ indicates the constraint of the transfer between production lines. $b_k$ is set to 0 when transfer is possible between resources (between production lines) between the process k and the process k+1. When transfer is impossible, $b_k$ is set to a numerical value other than 0. Formula 4 shows that more workpieces than the demand amount are processed for the product type i by the resource j in the process k. Formula 5 shows the total of the usage ratios of the product types in the resource j in the process k is not greater than the upper limit of the number of resources of the resource j. Formula 6 is a constraint equation for searching for only positive values for the usage ratio $x_{ijk}$.

In Formula 1, l (el) is the minimum integer that satisfies Formula 8. According to the product type, there are cases where not all processes included in one production line are performed. In other words, there are cases where some of the processes are skipped. In such a case, the demand amount d for the processes to be skipped for the product type is set to 0. Accordingly, the allocation ratio for each resource in the skipped processes for the product type is 0. If the demand amount for the skipped processes is used in the calculation of Formula 1, an erroneous number of transfers is calculated. The value l is used to exclude the skipped processes (the processes for which the demand amount is 0) from the calculation of the number of transfers.

$$l : d_{i \ k+l+1} > 0 \text{ Minimum } l \text{ that satisfies} \qquad \text{[Formula 8]}$$

FIGS. 3A to 3C, FIG. 4A, and FIG. 4B are examples of data utilized to generate a model used in an optimization calculation.

FIG. 3A is a table defining the processes. The table 100 shown in FIG. 3A includes processes 101, groups 102, a sequence 103, and constraints 104. The group 102 indicates the group to which each process 101 belongs. The group 102 represents a set of processes. Different processes belong to the same group if the processes use the same equipment. The sequence 103 indicates the sequence in which the processes 101 are performed. The constraint 104 indicates whether or not transfer is possible between groups (production lines). The constraint 104 is set to "1" if transfer to another production line after the process 101 is impossible.

A table 110 shown in FIG. 3B includes equipment 111, processes 112, and resources 113. The equipment 111 indicates the available processing machines. The process 112 indicates the process in which the equipment 111 is used. The resource 113 indicates the number of resources of the equipment 111 and corresponds to "n" in Formula 5. "1" corresponds to 100% and indicates that processing by the equipment 111 in the process 112 is possible. Other than "1", a numerical value such as "0.99" that corresponds to the operation condition of the equipment 111 may be set. "0" indicates that processing by the equipment 111 in the process 112 is not possible.

A table 120 shown in FIG. 3C shows the number of workpieces that can be processed per unit time. The table 120 includes items 121, equipment 122, processes 123, and capacities 124. The item 121 indicates the product type. The capacity 124 indicates the number of workpieces that the item 121 can process per unit time.

A table 130 shown in FIG. 4A includes product types 131, equipment 132, processes 133, and availability 134. The availability 134 indicates whether or not the equipment 132 is available in the process 133 in the production of the product type 131. In the example, "1" indicates "available". "0" indicates "unavailable".

A table 140 shown in FIG. 4B includes product types 141, processes 142, and demand amounts 143. The demand amount 143 indicates the number to be produced in the process 142 for the product type 141.

The optimization calculation part 11 generates the model shown in FIG. 2 based on the data of the tables shown in FIGS. 3A to 3C and FIGS. 4A and 4B. The optimization calculation part 11 uses the model to solve an optimization problem that includes the objective function and the constraint conditions. It is thereby calculated how the workpieces of each product type should be processed in which production line in each process to minimize the number of transfers. Based on the result of the optimization calculation, the optimization calculation part 11 outputs the allocation ratio between production lines for each process and the number of transfers between production lines.

When a solution is not obtained, the optimization calculation part 11 outputs data indicating the result. In such a case, the user modifies the input data or the constraint conditions. For example, the production plan amount is reduced. Or, the constraint conditions are relaxed. The relaxation of the constraint conditions includes releasing some transfer constraints, increasing the processing capacity of the resources, etc.

Figure 5:
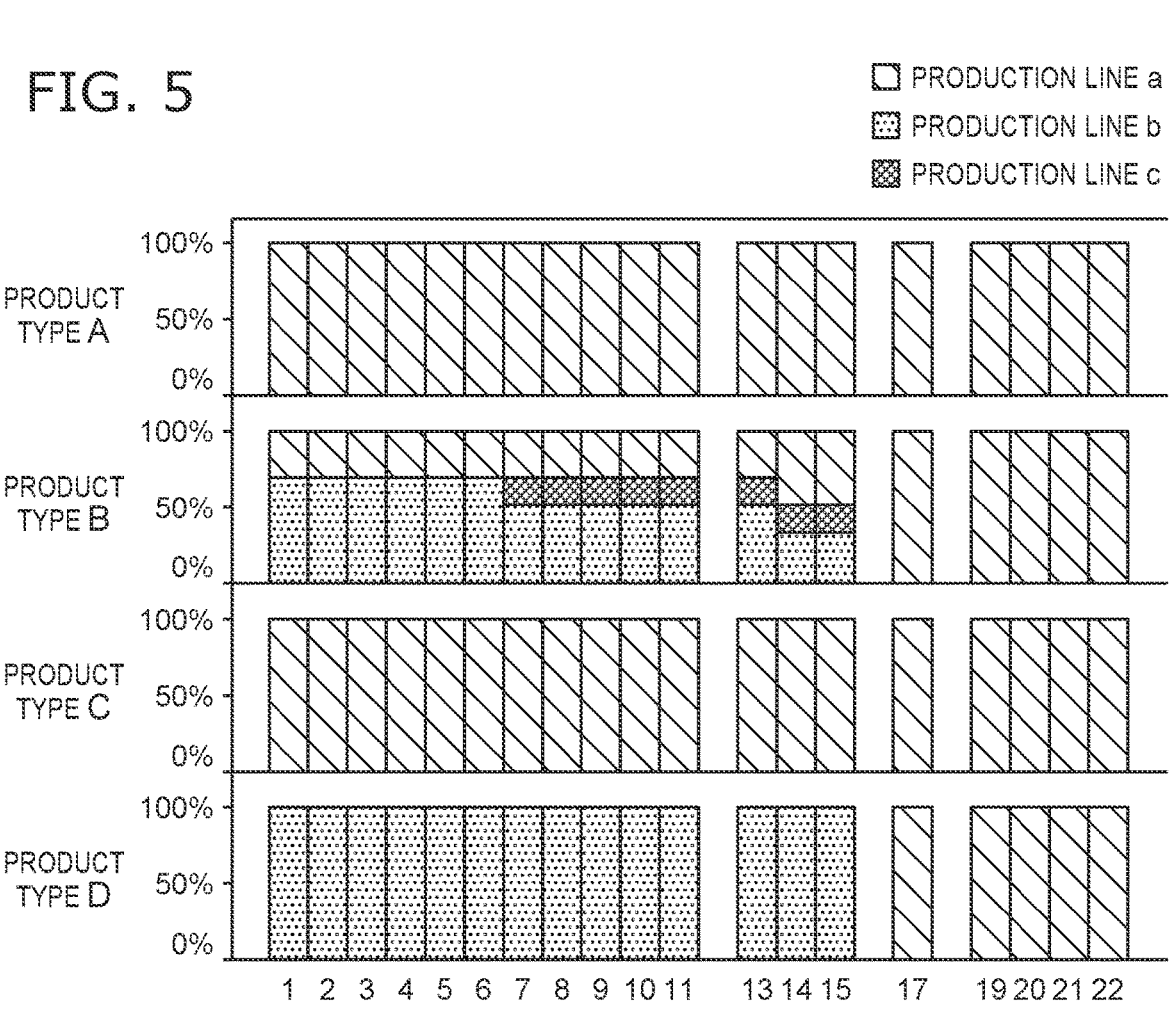
FIG. 5 is a schematic view showing a processing plan generated by the optimization calculation part.

FIG. 5 is a schematic view showing a processing plan generated by the optimization calculation part.

In the example of FIG. 5, the process 1 to 11, 13 to 15, 17, and 19 to 22 are performed in each of the production lines a to c. The workpieces of product types A to D are processed in the production lines a to c. The ratio of the processing by each production line is shown for each product type. The optimization calculation part 11 outputs the generated processing plan to the trial calculation part 12.

The objective function and the constraint functions are not limited to the example described above and are modifiable as appropriate. For example, instead of minimizing the number of transfers as the objective function, the objective function may be set to be when the number of transfers falls below a threshold. The threshold is set by the user. Also, an upper limit of the usage ratio $x_{ijk}$ may be set.

When the processing plan generated by the optimization calculation part 11 is performed, the trial calculation part 12 performs a trial calculation of whether or not the processing capacity required for the equipment in each process is greater than the upper limit. The trial calculation part 12 performs the trial calculation by using input data (third input data) and the allocation ratio included in the processing plan. The equipment is the machines for performing the processes. The input data is prepared beforehand by the user.

The input data includes the production plan amount, the cumulative non-defective rate, the equipment data, etc. The production plan amount is the planned production volume of the products. The cumulative non-defective rate is the overall non-defective rate for each process. The equipment data includes the number of operation days, the operation time, the operation ratio, the batch size, the processing time, etc. The number of operation days is the number of days the equipment operated in one month. The operation time is the operation time of the equipment per day. For example, the average operation hours of the production site is set as the operation time. The operation ratio is the ratio that the equipment actually operated. The product of the number of operation days, the operation time, and the operation ratio indicates the actual equipment operation time per month. The batch size is the number of workpieces that can be processed per batch. The processing time is the time necessary to perform the process once. The equipment data is set for each equipment.

As a result of the trial calculation, the trial calculation part 12 calculates the number of workpieces to be processed, the processing capacity, and the load factor for each equipment. The load factor is the ratio of the number of workpieces assigned to the equipment to the number of workpieces that can be processed by the equipment. The trial calculation part 12 determines whether or not each load factor that is calculated is greater than a prescribed threshold. For example, the threshold is set to 100%. In other words, the trial calculation part 12 determines whether or not the load is greater than the maximum processing capacity for any equipment. Considering equipment maintenance, etc., the threshold may be set to 99% or the like.

The trial calculation part 12 determines that the solution (the processing plan) calculated by the optimization calculation part 11 is inappropriate if any load factor is greater than the threshold. According to the determination result, the optimization calculation part 11 re-performs the optimization calculation. The input data or the constraint condition is modified at this time. Both the input data and the constraint condition may be modified, or only one may be modified. The input data or the constraint condition is modified by the user. The optimization calculation part 11 may automatically modify the input data or the constraint condition according to a preset rule.

The optimization calculation part 11 calculates another processing plan by optimization calculation using another input data or another constraint condition. The trial calculation part 12 performs a trial calculation of the load factor for the other processing plan and determines the appropriateness of the other processing plan. For example, the generation of the processing plan by the optimization calculation part 11 is repeated until the trial calculation part 12 determines the processing plan to be appropriate.

When all of the load factors are not more than the threshold, the trial calculation part 12 adds the load factors of the trial calculation to the processing plan. A processing plan showing the extent that each workpiece will be processed in each product type, production line, process, and equipment is obtained thereby. The processing plan to which the load factors are added is output by the trial calculation part 12 to the input plan generator 13.

Figure 6:
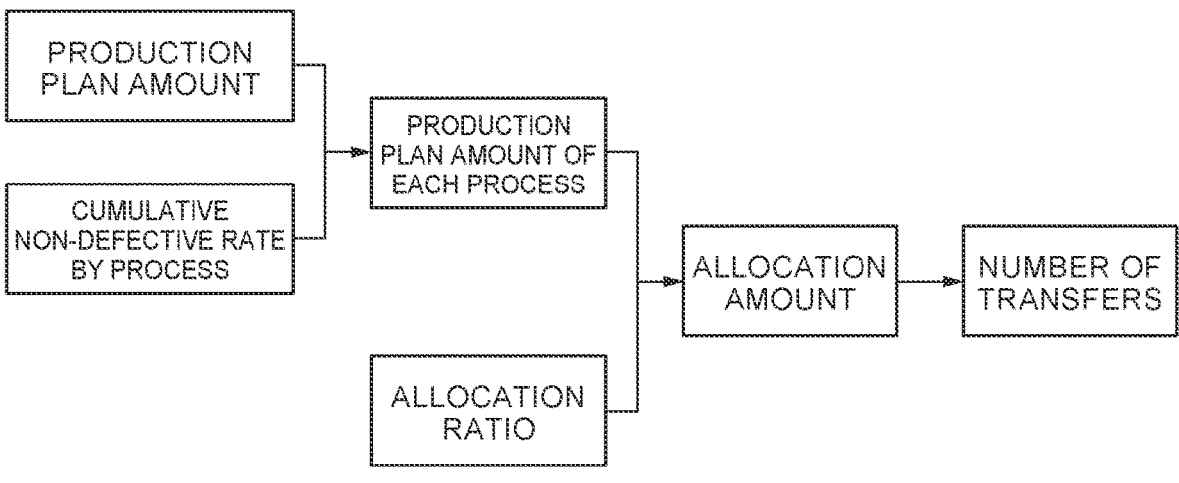
FIG. 6 is a schematic view showing the processing of the trial calculation part.
Figure 7:
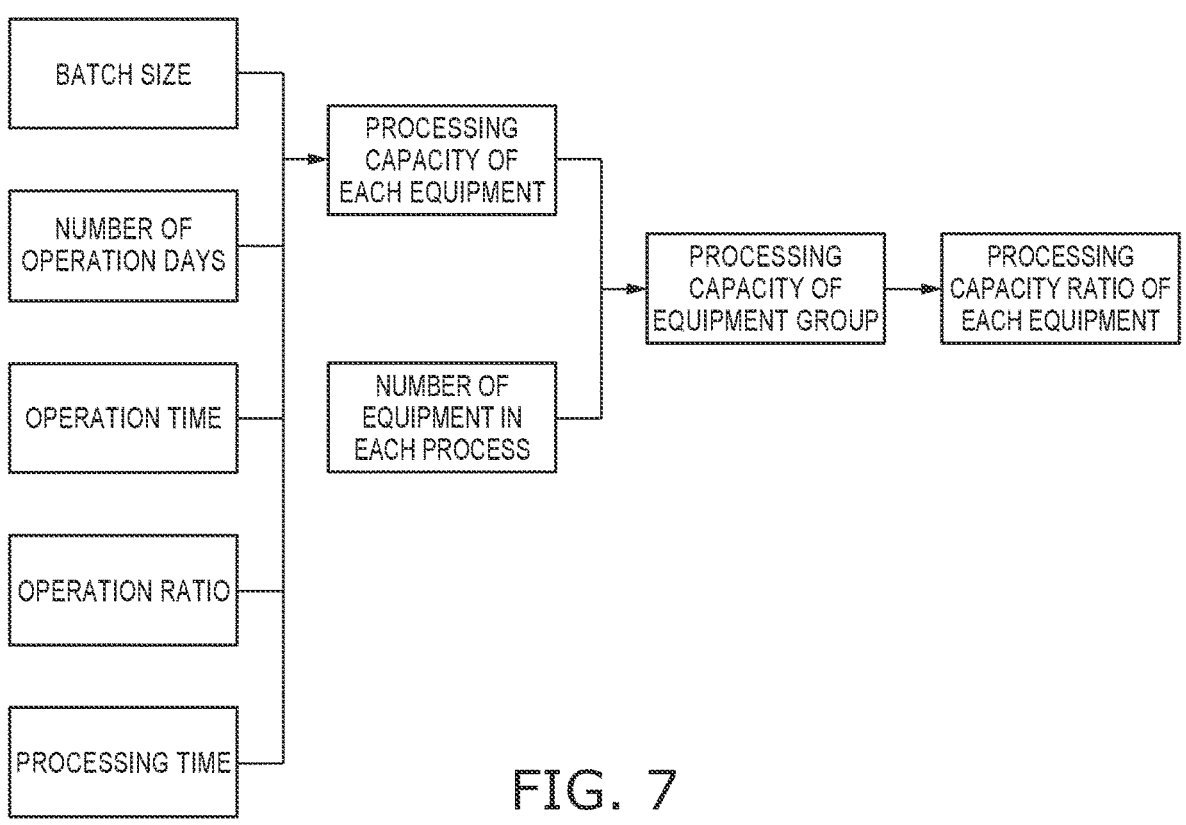
FIG. 7 is a schematic view showing the processing of the trial calculation part.
Figure 8:
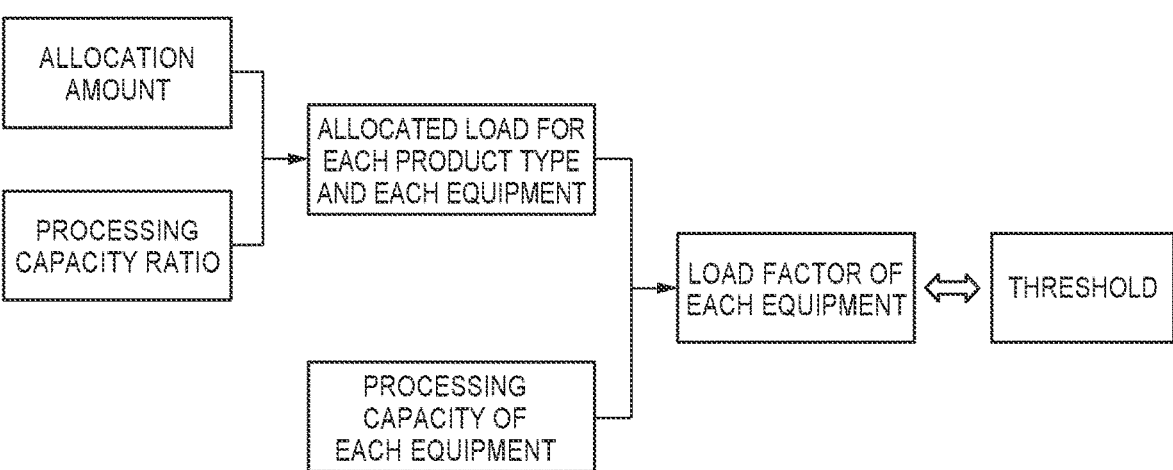
FIG. 8 is a schematic view showing the processing of the trial calculation part.

FIGS. 6 to 8 are schematic views showing the processing of the trial calculation part.

A specific method of the trial calculation is as follows. First, as shown in FIG. 6, the trial calculation part 12 calculates the production plan amount for each process based on the cumulative non-defective rate by process and the production plan amount that is input. The production plan amount of each process corresponds to the number of workpieces processed in each process. The production plan amount of each process is obtained by multiplying the cumulative non-defective rate by process by the production plan amount increased according to the yield. Or, the production plan amount of each process may be calculated by dividing, by the cumulative non-defective rate by process, the production plan amount that is not increased. The allocation amount of each production line in each process is obtained by multiplying the allocation ratio of each production line for the process by the production plan amount of each process. Also, the number of transfers between production lines can be calculated from the allocation amount difference between the processes before and after in each production line.

As shown in FIG. 7, the trial calculation part 12 calculates the processing capacity of each equipment based on the batch size of each equipment, the number of operation days, the operation time, the operation ratio of each equipment, and the processing time. For example, a score S that indicates the processing capacity is calculated by Formula 9 using a batch size s1, a number of operation days s2, an operation time s3, an operation ratio s4, and a processing time s5.

$$S = \frac{1}{1000} \times \frac{s1 + s2 + s3 + s4}{s5} \qquad \text{[Formula 9]}$$

The trial calculation part 12 calculates the processing capacity of an equipment group for each production line and each process by summing the processing capacity of each production line, each process, and each equipment according to the number of equipment of each process. The trial calculation part 12 calculates the processing capacity ratio of each equipment by dividing the processing capacity of each equipment by the processing capacity of the equipment group.

As shown in FIG. 8, the trial calculation part 12 calculates the allocated load of each equipment for each product type by multiplying the processing capacity ratio and the allocation amount of each process and each product type. The trial calculation part 12 calculates the load factor for each product type and each equipment by dividing the allocated load by the processing capacity of each equipment. The trial calculation part 12 calculates the sum of the load factors of the product types. The load factor when all allotted product types are processed by each equipment is calculated thereby. The trial calculation part 12 compares the calculated load factor of each equipment with a threshold.

The input data that is used in the trial calculation and the calculation method for the trial calculation are not limited to the example described above, and are modifiable as appropriate. For example, to simplify the calculation, the batch size, the actual operation time, the processing time, etc., may be set to common values among equipment. However, from the perspective of increasing the accuracy of the trial calculation, it is favorable for these data to be prepared. The production plan amount may be set by considering the cumulative non-defective rate. In such a case, it is unnecessary to set the cumulative non-defective rate.

The input plan generator 13 calculates the input amount of each product type into each production line. Also, based on the input amount, the input plan generator 13 calculates the input intervals of the workpieces of each product type by considering the batch size. Furthermore, based on the input amount, the input plan generator 13 calculates the input frequency of each product type. The input plan generator 13 generates the input plan based on the input interval and the input frequency.

Figure 9:
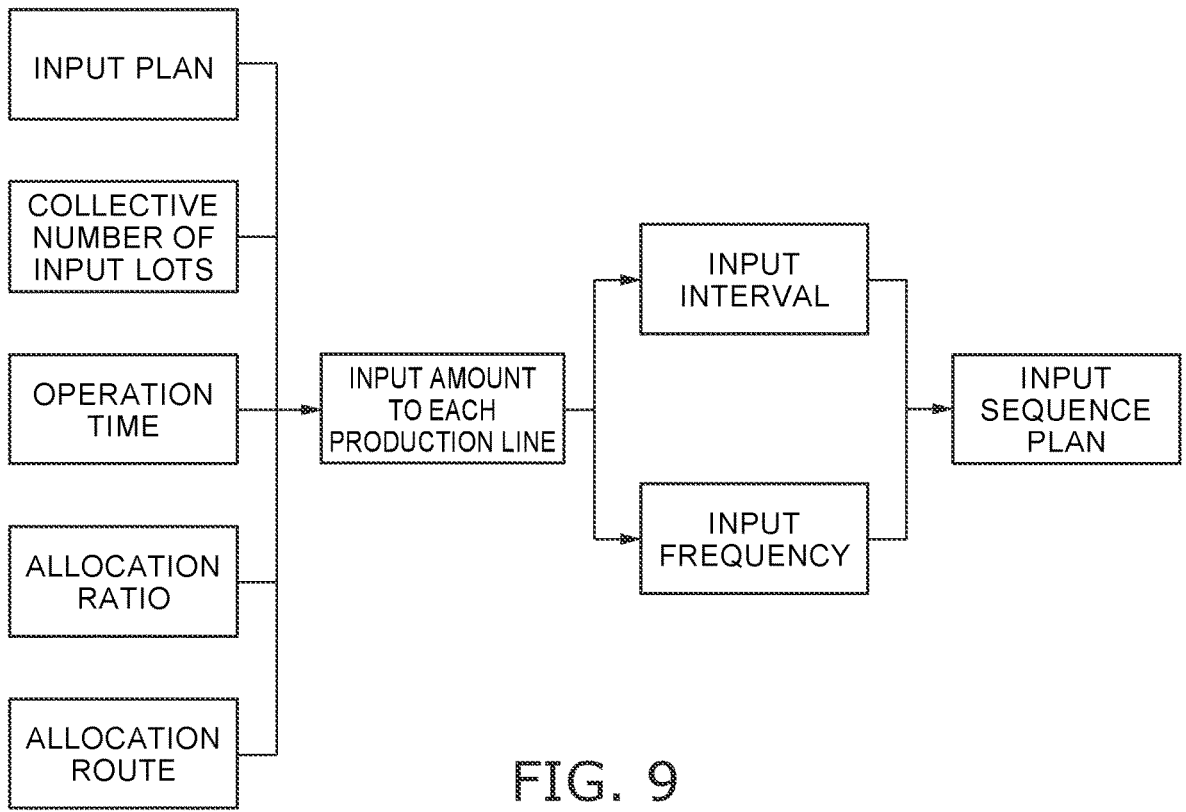
FIG. 9 is a schematic view showing the processing of the input plan generator.

FIG. 9 is a schematic view showing the processing of the input plan generator.

Specific processing of the input plan generator 13 will be described. First, the input plan generator 13 refers to the input data (the second input data). As shown in FIG. 9, the input data includes the input plan of each product type, the collective number of input lots, the operation time, the allocation ratio of the first process, and the allocation route. The input data is prepared beforehand by the user.

FIG. 10A, FIG. 10B, FIG. 11A, and FIG. 11B are examples of data used to generate the input plan.

Figures 10A, 10B:
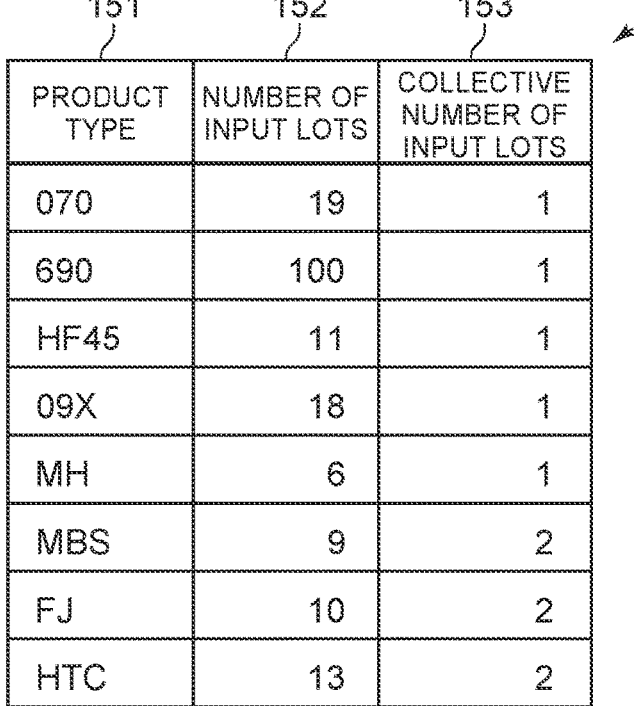
FIGS. 10A and 10B are examples of data used to generate the input plan.

FIG. 10A is a table illustrating the input amount and the collective number of input lots. The table 150 shown in FIG. 10A includes product types 151, number of input lots 152, and collective number of input lots 153. The number of input lots 152 is the total number of lots input to the production lines for each product type 151. The collective number of input lots 153 is the number of lots collectively input to the production line at one time. The collective number of input lots 153 is set by considering the batch sizes of bottleneck processes, etc.

FIG. 10B is a table illustrating the allocation ratio of the first process. The table 160 shown in FIG. 10B includes product types 161 and allocation ratios 162 to 164. The allocation ratios 162 to 164 are the allocation ratios of the production lines in the first process for each product type 161.

FIG. 11A is a table illustrating the operation time. The table 170 shown in FIG. 11A includes a number of operation days 171, an operation time 172, and a monthly operation time 173. The number of operation days 171 is the average number of operation days per month. The operation time 172 is the average operation time per day. The monthly operation time 173 is the average operation time per month.

FIG. 11B is a table showing allocation routes. The table 180 shown in FIG. 11B shows product types 181, number of lots 182, routes 183, and input lines 184. The route 183 indicates the processing route of multiple processes for producing each product type 181. The numeral of the route 183 indicates a specific processing route. The input line 184 indicates the first production line to which the lot is input.

FIGS. 12 to 17 are data illustrating processing results of the input plan generator.

The input plan generator 13 uses the input data to calculate the number of inputs to each production line. The number of inputs can be calculated by "(number of input lots×first process allocation ratio)/collective number of input lots". For example, as shown in FIG. 12, the data of a table 190 that includes product types 191, number of inputs 192, and number of inputs 193 is calculated. The table 190 shows the number of inputs for each product type 191 and each production line.

The input plan generator 13 calculates the input interval to each production line. The input interval is calculated by "monthly operation time/production line total number of inputs". For example, when each production line operates 28 days per month and 24 hours per day, the input interval is calculated by 28 days×24 h/83 times for the "production line a" shown in FIG. 12. As a result of the calculation, the lot input interval for the "production line a" is once every 8.1 hours. The lot input interval for the "production line b" is once every 7.6 hours.

The input plan generator 13 calculates the input frequency to each production line. The input frequency indicates how often each product type is input, i.e., once out of how many times. The input frequency is calculated by "number of inputs to production line/number of inputs of product type". As a result of the calculation, for example, as shown in FIG. 13, one lot of the product type "690" is input to the "production line a" every two or three times. One lot is input to the "production line b" every one or two times.

The input plan generator 13 plans the input sequence. The input plan generator 13 randomly assigns a route to each product type so that the lots are not concentratively processed by a specific route in a specific time frame. FIG. 14 shows a table in which input frequencies and random numbers are added to a part of the data shown in FIG. 11B. The table 200 shown in FIG. 14 illustrates only the data related to the "production line b" and the product type "690". The table 200 includes random numbers 205 in addition to product types 201, input frequencies 202, collective number of lots 203, and routes 204.

The data in which the random numbers have been included is sorted by random number by the input plan generator 13. A table 200a of FIG. 15 shows the results of the product type 201, the input frequency 202, the collective number of lots 203, and the route 204 sorted by the random number 205. The sort by random number randomizes the listing order of the routes 204. The input plan generator 13 generates similar data by including a random number with each product type and each production line.

The input plan generator 13 summarizes the data in which the random numbers are included with each product type and each production line. The input plan generator 13 assigns lot numbers in order to each product type and each production line and assigns a random number. The input plan generator 13 uses the input frequency, the lot number, and the random number to calculate a score for the input of each product type. The input plan generator 13 determines the input sequence by sorting the data by score.

FIG. 16 shows a table 220 that summarizes data including the random numbers. The table 220 includes product types 221, input frequencies 222, collective number of lots 223, routes 224, lot numbers (No.) 225, random numbers 226, and scores 227. The lot numbers 225 are assigned to the product types 221 in order from the top of the table. The product of the input frequency, the lot number, and the random number is used as the score 227. The table 220 shows the results of sorting by the score 227. A leveled input sequence is obtained thereby in which no specific product type is concentratively input.

The input plan generator 13 adds the input timing calculated based on the input interval to the input sequence that is obtained. An input plan that specifies which product type workpieces are input to which route at which timing is obtained thereby.

FIG. 17 shows a table 220a obtained by adding a sequence 228 and input timing 229 to the product types 221, the input frequencies 222, the collective number of lots 223, and the routes 224 of the table 220. The input timing 229 shows when to input the workpieces of each sequence 228 as referenced to the input timing of the first workpiece.

Thus, the input plan generator 13 generates the input plan indicating the input timing of the lots (the workpieces) to the multiple production lines. More specifically, the input plan indicates when to input a lot of which product type to which processing route. The lots that are input are processed according to the processing plan. The generated input plan and the processing plan to which the load factors are added are transmitted to the verification part 14 by the input plan generator 13.

The input data that is used to generate the input plan is not limited to the examples described above and is modifiable as appropriate. For example, to make it easy to prepare the input data, a common value of the collective number of input lots may be set for each product type, or a minimum value of "1" may be automatically set. However, from the perspective of increasing the accuracy of the input plan, it is favorable to set the collective number of input lots for each product type. The input sequence may be leveled using a technique other than random numbers.

The verification part 14 verifies the appropriateness of the input plan and the processing plan that are generated. The verification part 14 sets the elements of the simulation model based on the input. The verification part 14 operates the simulation model according to the input plan and the processing plan.

Figures 18, 19:
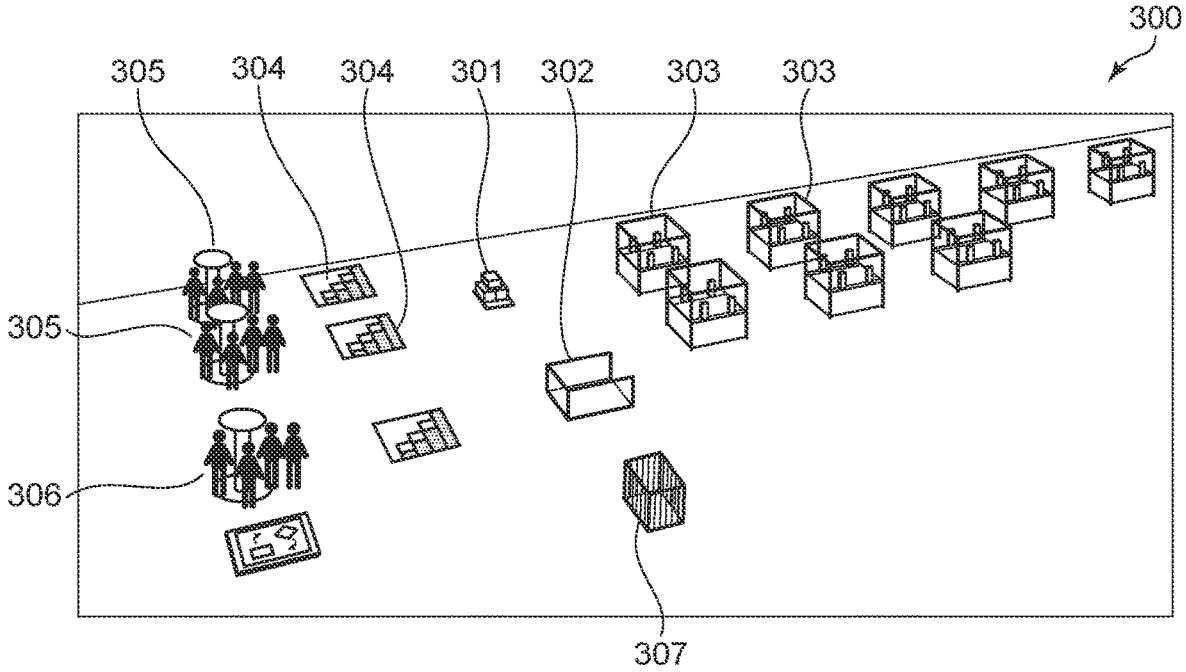
FIG. 18 is a schematic view showing components of the simulation model.
FIG. 19 is an example of data used in the simulation.

FIG. 18 is a schematic view showing components of the simulation model.

As shown in FIG. 18, the simulation model 300 includes an input part 301, a buffer 302, equipment 303, shifts 304, workers 305, resources 306, and a payout part 307. The input part 301 inputs lots made of multiple workpieces to the production lines. The buffer 302 holds lots waiting to be processed. The equipment 303 processes the lots by performing the processes. The processing capacity of the equipment 303 is set based on input data (fourth input data). The shifts 304 indicate the operation time of the equipment and the workers. The workers 305 are workers. Each worker is set to processes that can be handled. The resources 306 are the available jigs. For convenience of the simulation in the example shown in FIG. 18, the jigs also are treated as workers. The payout part 307 is a unit that pays out the lots. The lots for which the processing is completed are deleted by the payout part 307.

FIGS. 19 to 25B are examples of data used in the simulation.

The input part 301 generates lots based on the tables prepared beforehand and the input plan generated by the input plan generator 13. A lot is made of multiple lots. For example, as shown in FIG. 19, a table 400 includes product types 401, processing IDs 402, and numbers 403. The table 400 sets which processing is to be performed on the lots of each product type 401.

The equipment 303 processes each lot based on a processing table and a flow table. The equipment 303 that processes the lots in each process is allotted according to the processing plan. The workers 305 and the resources 306 related to each process are assigned based on the allocation table.

FIG. 20 is an example of a processing table. The processing table 420 shown in FIG. 20 includes product types 421, processing IDs 422, processing names 423, processing times 424, and machines 425. The processing time 424 is the time necessary to perform the processing specified by each processing ID 422. The machine 425 is used when performing the processing.

FIG. 21 is an example of a flow table. The flow table 440 shown in FIG. 21 includes product types 441, processing IDs 442, processing names 443, preprocessing IDs 444, and preprocessing names 445. The preprocessing ID 444 indicates the processing performed before the processing corresponding to the processing ID 442. In other words, after the processing corresponding to the preprocessing ID 444 is performed, the processing that corresponds to the processing ID 442 is performed.

FIG. 22 is an example of an allocation table. The allocation table 460 shown in FIG. 22 includes product types 461, processing IDs 462, processing names 463, resources 464, types 465, and amounts 466. The resource 464 indicates the resource assigned to the process indicated by the processing ID. The resources are workers, jigs, etc. The type 465 indicates the type of task that can be processed by the resource 464. For example, "task A" indicates that the jig for the task A is used in the processing specified by the processing ID "P1_02". The amount 466 is the number of the necessary resources 464 in the process indicated by the processing ID. For example, it is indicated that one worker that can perform the task A is necessary to process the process indicated by the processing ID "P1_02".

The workers 305 work according to the data set in a shift table and a worker table. FIG. 23 is an example of a shift table. The shift table 480 shown in FIG. 23 includes shift types 481, shift start times 482, shift end times 483, and break times 484. The shift start time 482, the shift end time 483, and the break time 484 between the shift start time 482 and the shift end time 483 are set for each shift type 481.

Figures 24, 25A, 25B:
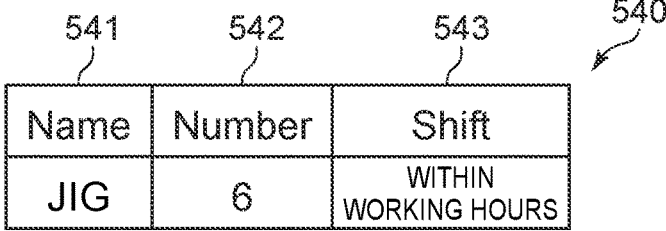
FIG. 24 is an example of data used in the simulation.
FIGS. 25A and 25B are examples of data used in the simulation.

FIG. 24 is an example of a worker table. The worker table 500 shown in FIG. 24 includes worker names 501, shift types 502, and target tasks 503 to 505. The worker that is specified by the worker name 501 works in the shift indicated by the shift type 502. The target tasks 503 to 505 show the tasks performed by each worker. "1" indicates that the worker performs the task. A blank cell indicates that the worker does not perform the task.

The equipment 303 mimics the actual operation conditions of the equipment. For example, an equipment failure table 520 shown in FIG. 25A is prepared to reflect the actual operation conditions of the equipment. The equipment failure table 520 includes machine names 521, numbers 522, capacities 523, shift types 524, mean time between failure (MTBF) 525, and mean time to repair (MTTR) 526. The capacity 523 indicates the number of lots that can be simultaneously processed. The MTBF 525 is the average operation time until failure. The MTTR 526 is the average time from failure to recovery. By setting the MTBF 525 and the MTTR 526, the appropriateness of the processing plan and the input plan can be verified by considering the actual operation conditions of the machine.

For example, a jig table 540 shown in FIG. 25B is prepared for the resource 306. The jig table 540 includes names 541, numbers 542, and shift types 543. The time frame (the shift) and the number of available jigs are set by the jig table 540.

Figure 26:
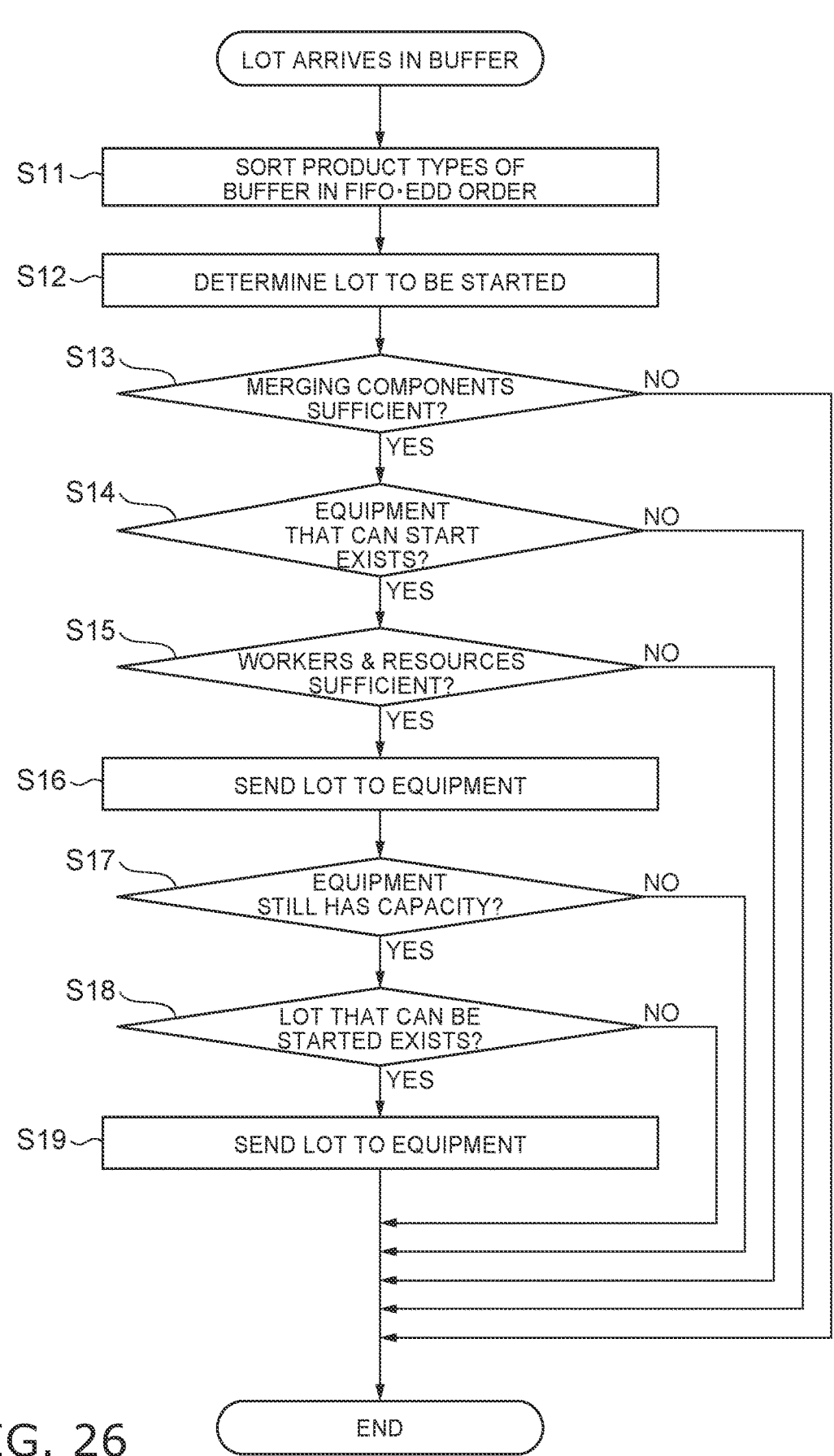
FIG. 26 is a flowchart showing operations of the simulation of the verification part.
Figure 27:
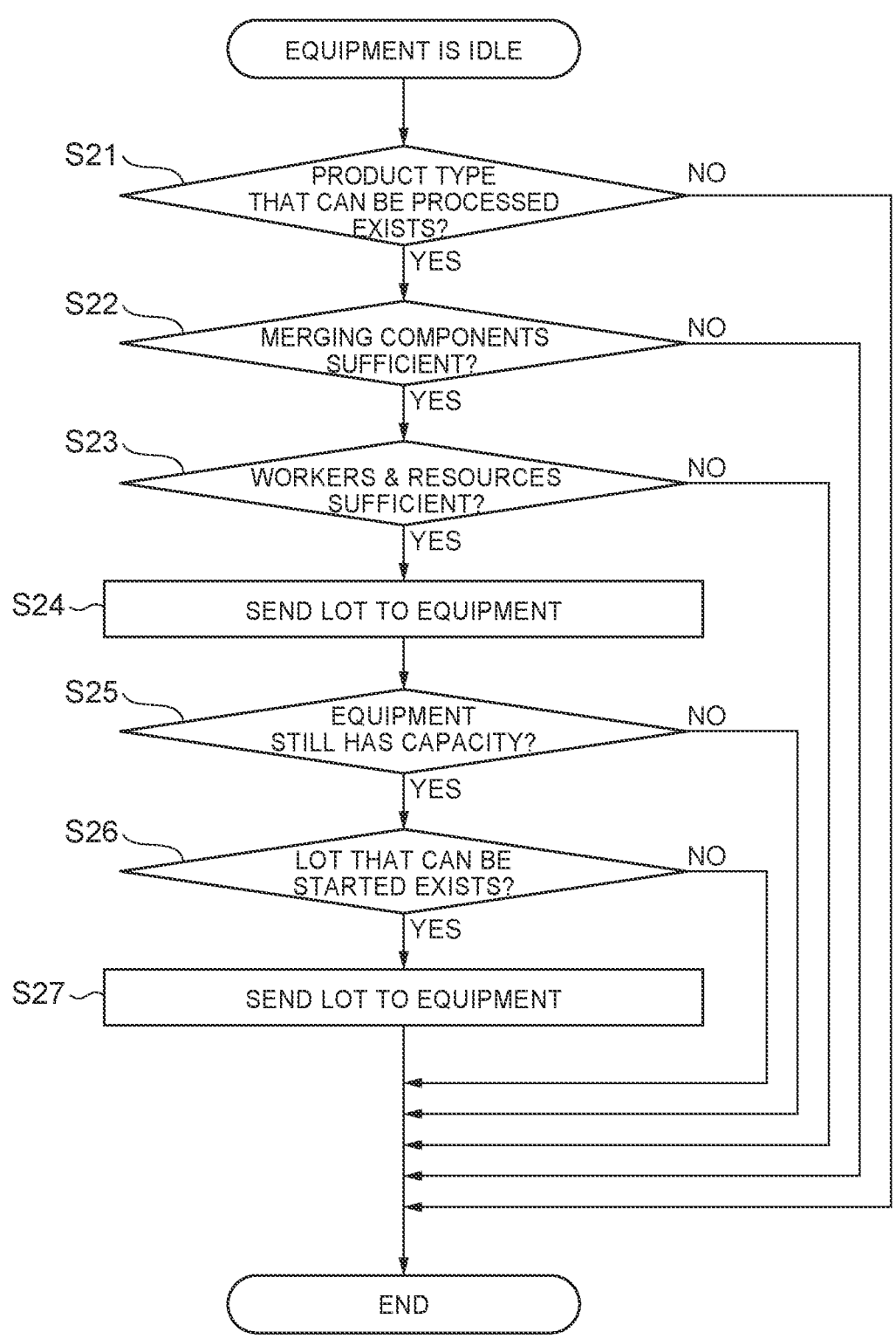
FIG. 27 is a flowchart showing operations of the simulation of the verification part.
Figure 28:
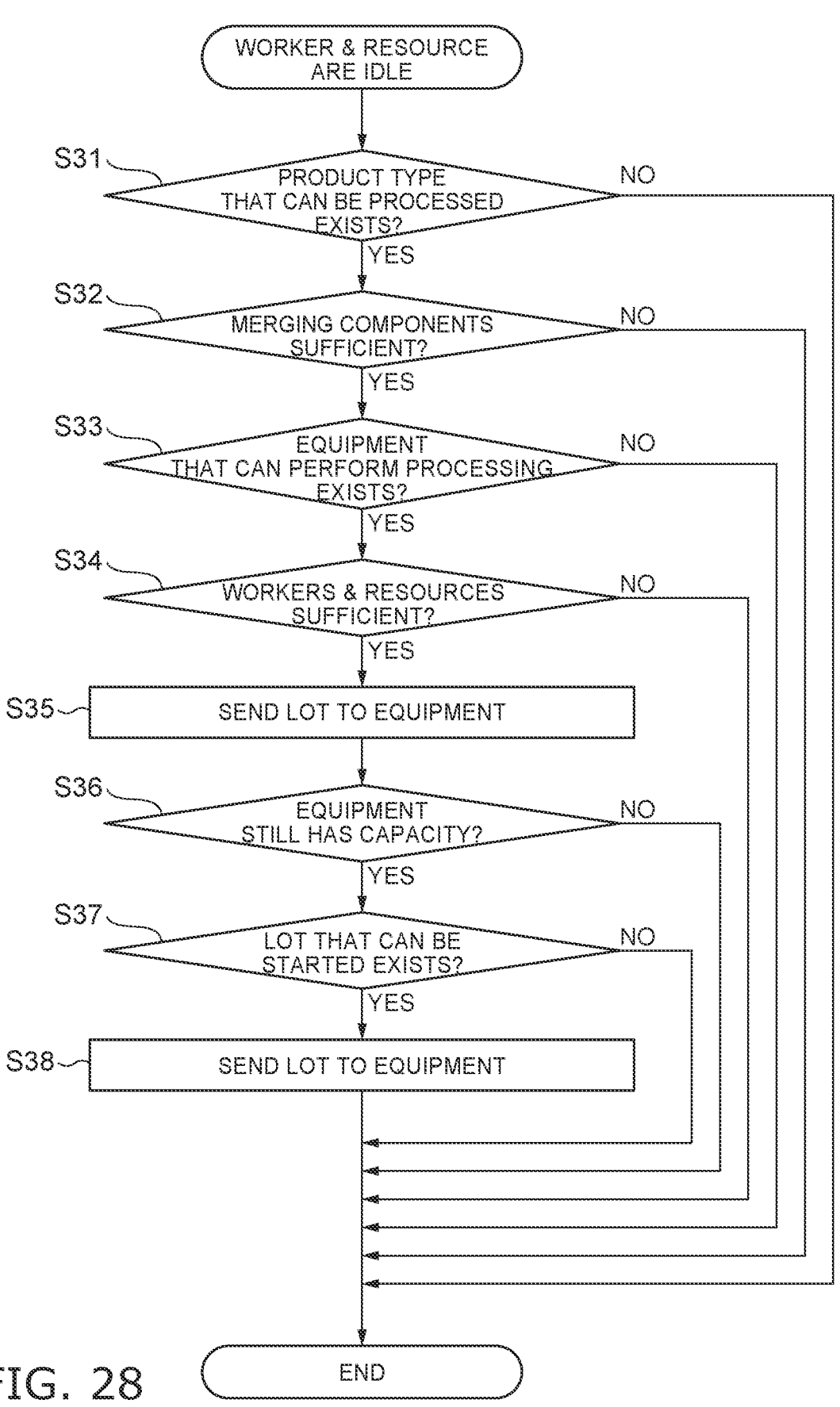
FIG. 28 is a flowchart showing operations of the simulation of the verification part.

FIGS. 26 to 28 are flowcharts showing operations of the simulation of the verification part.

The flowchart of FIG. 26 shows the operation of sending a lot from the buffer 302 to the equipment 303. First, the operation starts when the lot arrives at the buffer 302. The buffer 302 sorts the product types in the buffer 302 in the order of first-in-first-out (FIFO) and earliest delivery date (EDD) (step S11). The buffer 302 determines the lot to be started based on the sorted results (step S12). For example, a lot is preferentially started when the lot has a short delivery date and is sent to the buffer 302 early. When the lot to be started is determined, it is determined whether or not the merging components are sufficient (step S13). There are cases where one process uses multiple components processed by multiple previous processes. Herein, such multiple components are called merging components. Step S13 determines whether or not all of the components necessary to start have merged.

When the merging components are sufficient, it is determined whether or not the equipment can start (step S14). When there is equipment that can start, it is determined whether or not the necessary workers and resources are sufficient (step S15). When the necessary workers and resources are sufficient, the buffer 302 sends the lot to the equipment 303 (step S16). Then, it is determined whether or not the equipment still has capacity (step S17). When the equipment still has capacity, it is determined whether or not the buffer 302 has a lot that can be started (step S18). When a lot can be started, the lot is sent to the equipment 303 (step S19). The operation ends when the merging components are insufficient in step S13, when no equipment 303 can start in step S14, when the workers and resources are insufficient in step S15, when the equipment has no capacity in step S17, when no lot can be started in step S18, or when step S19 is completed.

When the buffer 302 has a lot that can start, the lot is sent to the equipment 303 by the operation shown in FIG. 26.

The flowchart of FIG. 27 shows another operation of sending a lot from the buffer 302 to the equipment 303. The operation shown in FIG. 27 is started when the equipment 303 is idle. First, it is determined whether or not the buffer 302 has a product type that can be processed (step S21). A product type that can be processed refers to a product type that can be processed by the equipment 303. When there is a product type that can be processed, it is determined whether or not the merging components are sufficient (step S22). When the merging components are sufficient, it is determined whether or not the necessary workers and resources are sufficient (step S23). When the necessary workers and resources are sufficient, the buffer 302 sends the lot to the equipment 303 (step S24). It is determined whether or not the equipment still has capacity (step S25). When the equipment still has capacity, it is determined whether or not the buffer 302 has a lot that can be started (step S26). When there is a lot that can be started, the lot is sent to the equipment 303 (step S27). The operation ends when the merging components are insufficient in step S22, when the workers and the resources are insufficient in step S23, when the equipment has no capacity in step S25, when no lot can be started in step S26, or when step S27 is completed.

A product type that is waiting in the buffer 302 is started by the operation shown in FIG. 27 when the equipment 303 becomes able to process lots.

The flowchart of FIG. 28 shows another operation of sending a lot from the buffer 302 to the equipment 303.

The operation shown in FIG. 28 is started when the worker 305 and the resource 306 are idle. First, it is determined whether or not the buffer 302 has a product type that can be processed (step S31). When there is a product type that can be processed, it is determined whether or not the merging components are sufficient (step S32). When the merging components are sufficient, it is determined whether or not there is equipment that can perform the processing (equipment is idle) (step S33). When there is equipment that can perform the processing, it is determined whether or not the necessary workers and resources are sufficient (step S34). When the necessary workers and resources are sufficient, the buffer 302 sends a lot to the equipment 303 (step S35). Then, it is determined whether or not the equipment still has capacity (step S36). When the equipment still has capacity, it is determined whether or not the buffer 302 has a lot that can be started (step S37). When there is a lot that can be started, the lot is sent to the equipment 303 (step S38).

The operation ends when no product type can be processed in step S31, when the merging components are insufficient in step S32, when no equipment can perform the processing in step S33, when the workers and resources are insufficient in step S34, when the equipment has no capacity in step S36, when no lot can be started in step S37, or when step S38 is completed.

A product type that is waiting in the buffer 302 is started by the operation shown in FIG. 28 when the worker 305 and the resource 306 become able to process a lot.

The simulation calculates how many lots of each product type will be produced and by when. Based on the result of the simulation, the verification part 14 determines whether or not the products of the preset production plan amount can be produced by the delivery date. When the products of the production plan amount cannot be produced by the delivery date, the verification part 14 determines that the generated processing plan and the generated input plan are inappropriate. When the products of the production plan amount can be produced by the delivery date, the verification part 14 determines that the generated processing plan and the generated input plan are appropriate.

The verification part 14 may calculate an evaluation value indicating the evaluation of the processing plan and the input plan. For example, in the calculation, the evaluation value increases as the evaluation becomes more affirmative. The evaluation value is calculated to be high when the production plan amount is achieved. Also, in the calculation, the evaluation value increases as the difference between the operation ratio of the equipment and the load factor of the trial calculation decreases. Also, the evaluation value of the processing plan and the input plan may be calculated based on the time period in which the products of the production plan amount are produced and the time until the delivery date. The verification part 14 may determine the appropriateness of the processing plan and the input plan based on the evaluation value. For example, the evaluation value is calculated according to the difference between the time period in which the products are produced and the time until the delivery date. In the calculation, the processing plan and the input plan are evaluated more affirmatively and the evaluation value increases as the time period of the production decreases with respect to the time until the delivery date.

When the verification part 14 determines that the processing plan and the input plan are inappropriate, the optimization calculation part 11 re-performs the optimization calculation. For example, similarly to when the trial calculation part 12 determines the processing plan to be inappropriate, the optimization calculation part 11 calculates another processing plan by optimization calculation using another input data or another constraint condition. Then, the trial calculation part 12 determines the appropriateness of the other processing plan. The input plan generator 13 generates another input plan based on the other processing plan. The input data for generating the input plan may be modified at this time. For example, a processing route for processing a workpiece is modified. The verification part 14 uses the other processing plan and the other input plan to verify the appropriateness.

Siemens Plant Simulation can be utilized as the simulator of the verification. The input plan can be verified by Siemens Plant Simulation by setting the input part 301, the buffer 302, the equipment 303, the shift 304, the worker 305, the resource 306, and the payout part 307 and preparing the various input data.

A production plan that includes a processing plan and an input plan is obtained by the processing described above. Production according to the production plan can produce the planned number of products by the delivery date.

In the example described above, all of the data is prepared as tables. The data may be prepared in formats other than tables. Data that can be utilized in the generation of the production plan may be calculated from other data by preparing Formulas, etc.

Figure 29:
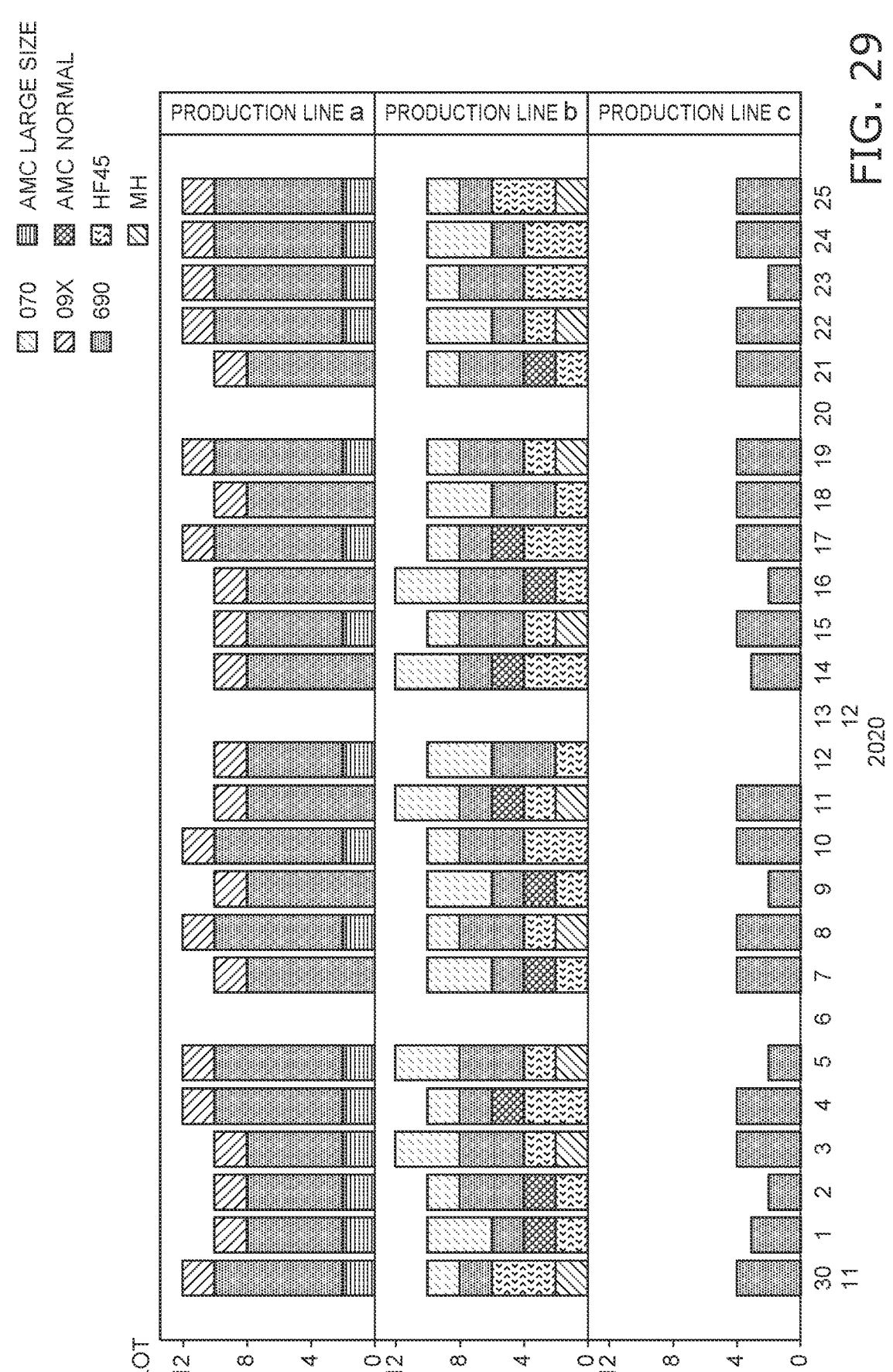
FIG. 29 is a graph illustrating the generated production plan.

FIG. 29 is a graph illustrating the generated production plan.

In FIG. 29, the horizontal axis is the date. The vertical axis is the number of lots to be processed. Which product types are to be processed by when and to what extent are planned for each of the three production lines a to c. The products of the preset production plan amount can be produced by the delivery date by processing the workpieces according to the generated production plan.

The processing machine 10 outputs the generated production plan. For example, the processing machine 10 transmits the data of the production plan to an external server by File Transfer Protocol (FTP), etc. The processing machine 10 may insert the data into an external database server by performing database communication using Open Database Connectivity (ODBC), etc. The processing machine 10 may output the data in a prescribed file format such as Comma Separated Value (CSV), etc., and may write the data to a recording medium such as flash memory, etc. The processing machine 10 may output the production plan to an output device such as a monitor, etc. For example, the processing machine 10 displays the production plan shown in FIG. 29 on a graphical user interface.

Figure 30:
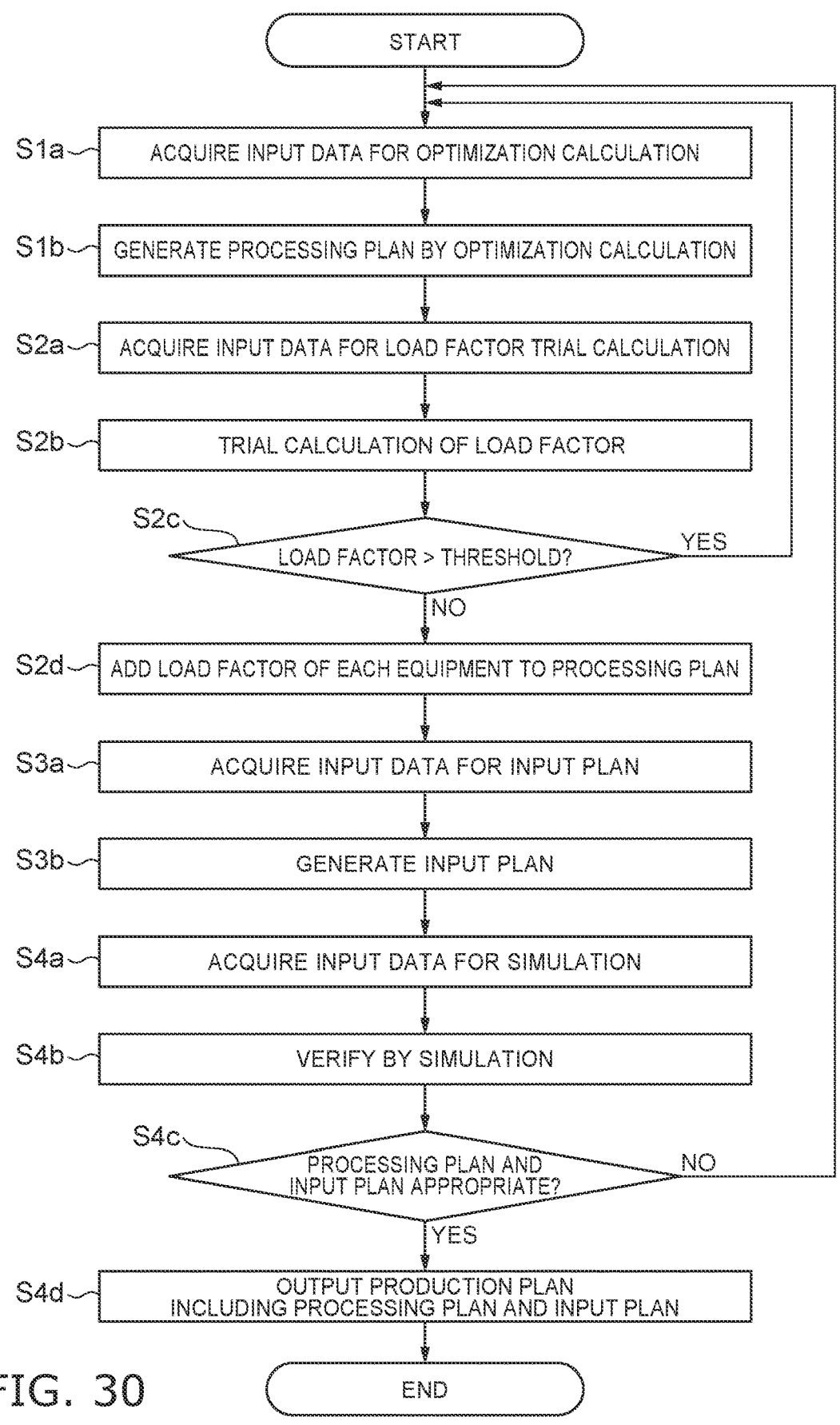
FIG. 30 is a flowchart showing an overview of the generation method according to the embodiment.

FIG. 30 is a flowchart showing an overview of the generation method according to the embodiment.

The optimization calculation part 11 acquires input data (the first input data) for the optimization calculation (step S1a). The optimization calculation part 11 generates a processing plan by optimization calculation based on the input data (step S1b). The trial calculation part 12 acquires input data (the third input data) for a load factor trial calculation (step S2a). The trial calculation part 12 performs a trial calculation of the load factor for each equipment based on the processing plan and the input data (step S2b). The trial calculation part 12 determines whether or not any of the load factors are greater than a threshold (step S2c). When any of the load factors are greater than the threshold, the optimization calculation is re-performed. When no load factor is greater than the threshold, the trial calculation part 12 adds the load factor of each equipment to the processing plan (step S2d). The input plan generator 13 acquires input data (the second input data) for the input plan (step S3a). The input plan generator 13 generates an input plan based on the input data (step S3b). The verification part 14 acquires input data for the simulation (step S4a). The verification part 14 verifies the processing plan and the input plan by the simulation (step S4b). Based on the result of the simulation, the verification part 14 verifies the appropriateness of the processing plan and the input plan (step S4c). When the processing plan and the input plan are determined to be inappropriate, the optimization calculation is re-performed. Or, the generation of the input plan may be re-performed. When the processing plan and the input plan are determined to be appropriate, the verification part 14 outputs the production plan including the processing plan and the input plan (step S4*d*).

Advantages of embodiments will now be described.

In a general production site, the processing capacity of the equipment installed in each production line is different. Conventionally, it has been difficult to generate a production plan that considers the difference between the production lines. Also, there are many elements to consider when generating the production plan such as the load on the equipment, the load balance between production lines, the number of transfers between production lines, etc. Therefore, a long period of time had been necessary to generate a production plan.

For these problems, in the generation system 1 according to the embodiment, an optimization calculation is used to generate a processing plan indicating the production plan amount for each product type, each production line, and each process. Input data such as the input amount of the lots (the workpieces) to each production line for each product type, the processing route of each product type, etc., are used to generate an input plan indicating the input timing of the lots to each production line. The appropriateness of the plans is verified by a simulation based on the processing plan and the input plan. According to this series of processing, the production plan can be generated with higher accuracy. Good accuracy refers to, for example, little error between the planned schedule and the schedule of the actual production when production is actually performed according to the production plan. Once the input data is prepared, it is unnecessary for a human to spend much time generating the production plan because the generation system 1 can generate the production plan.

To further increase the accuracy of the generated production plan, it is favorable to perform a trial calculation of the load factor of each equipment as shown in FIG. 30. There are cases where multiple pieces of equipment are prepared to perform one process. In such a case, when one set of equipment is requested to process more workpieces than possible, the equipment cannot process the requested number of workpieces. The trial calculation can determine whether or not the processing plan can be performed when the load of each equipment is considered.

Figure 31:
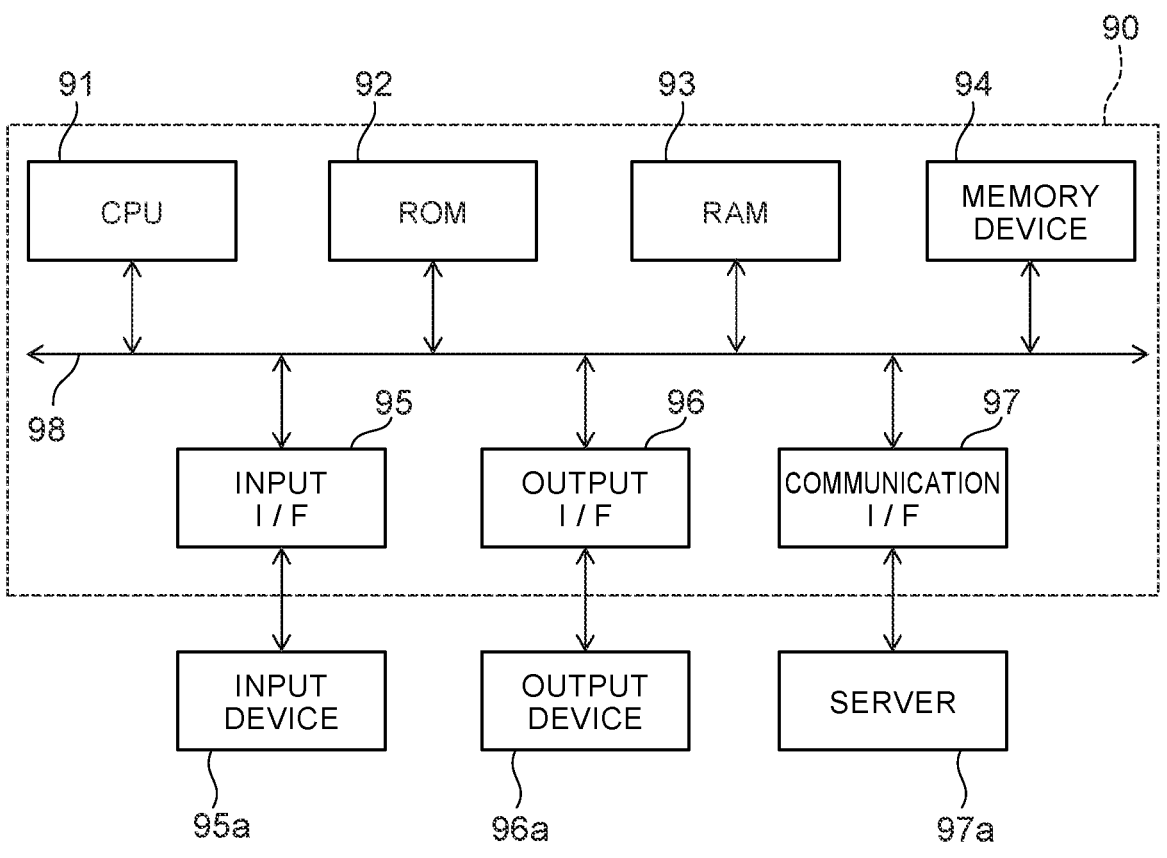
FIG. 31 is a schematic view illustrating a hardware configuration.

FIG. 31 is a schematic view illustrating a hardware configuration.

For example, a computer 90 illustrated in FIG. 31 can be used as the processing machine 10. The computer 90 includes a CPU 91, ROM 92, RAM 93, a memory device 94, an input interface 95, an output interface 96, and a communication interface 97.

The ROM 92 stores programs that control the operations of the computer 90. Programs that are necessary for causing the computer 90 to realize the processing described above are stored in the ROM 92. The RAM 93 functions as a memory region into which the programs stored in the ROM 92 are loaded.

The CPU 91 includes a processing circuit. The CPU 91 uses the RAM 93 as lot memory to execute the programs stored in at least one of the ROM 92 or the memory device 94. When executing the programs, the CPU 91 executes various processing by controlling configurations via a system bus 98. By executing the programs, the computer 90 functions as the optimization calculation part 11, the trial calculation part 12, the input plan generator 13, and the verification part 14 described above.

The memory device 94 stores data necessary for executing the programs and/or data obtained by executing the programs.

The input interface (I/F) 95 connects the processing machine 10 and an input device 95*a*. The input I/F 95 is, for example, a serial bus interface such as USB, etc. The CPU 91 can read various data from the input device 95*a* via the input I/F 95.

The output interface (I/F) 96 connects the processing machine 10 and an output device 96*a*. The output I/F 96 is, for example, an image output interface such as Digital Visual Interface (DVI), High-Definition Multimedia Interface (HDMI (registered trademark)), etc. The CPU 91 can transmit data to the output device 96*a* via the output I/F 96 and cause the output device 96*a* to display an image.

The communication interface (I/F) 97 connects the processing machine 10 and a server 97*a* outside the processing machine 10. The communication I/F 97 is, for example, a network card such as a LAN card, etc. The CPU 91 can read various data from the server 97*a* via the communication I/F 97.

The memory device 94 includes at least one selected from a hard disk drive (HDD) and a solid state drive (SSD). The input device 95*a* includes at least one selected from a mouse, a keyboard, a microphone (audio input), and a touchpad. The output device 96*a* includes at least one selected from a monitor, a projector, a printer, and a speaker. A device such as a touch panel that functions as both the input device 95*a* and the output device 96*a* may be used.

The functions of the optimization calculation part 11, the trial calculation part 12, the input plan generator 13, and the verification part 14 may be realized by one computer 90 or may be realized by a collaboration of multiple computers 90. For example, the generation system 1 includes multiple processing machines 10 (computers 90). Each of the multiple processing machines 10 may function as the optimization calculation part 11, the trial calculation part 12, the input plan generator 13, and the verification part 14.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

According to the embodiments described above, a generation system, a generation method, a program, and a storage medium are provided in which a production plan can be generated with higher accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A generation system generating a production plan for producing products of a plurality of product types by a plurality of processes using a plurality of production lines, the production lines including a series of processes for processing workpieces along a plurality of processing routes, with the workpieces being transferred between the processes and between the production lines, a plurality of equipment being used in the processes, the generation system comprising:

one or more processors; and a memory storing instructions that, when executed by the one or more processors, cause the one or more processors to perform operations including:

generating a processing plan by performing an optimization calculation using first input data, the first input data including a production plan amount of each of the product types and a processing capacity of each equipment, the optimization calculation comprising an objective function including an objective of minimize a number of transfers between the production lines and a constraint condition including a constraint on transfer between the production lines, the processing plan being of a production plan amount for each of the product types, each of the production lines, and each of the processes;

generating an input plan using second input data, the second input data including an input amount of the workpieces to each of the production lines for each of the product types, the second input data further including the processing routes in the processes for each of the product types, the input plan being of an input timing of the workpieces to the production lines;

determining whether an appropriateness criterion is satisfied for the processing plan and the input plan by executing, on the one or more processors, a simulation based on the processing plan and the input plan, the simulation modeling at least equipment resources, operator resources, fixture resources, shift schedules, and equipment failure and recovery; and outputting the production plan when the appropriateness criterion is satisfied, the production plan comprises the processing plan and the input plan.

2. The generation system according to claim 1, wherein when the appropriateness criterion is not satisfied, the instructions further cause the one or more processors to generate another processing plan by performing the optimization calculation using another first input data or another constraint condition.

3. The generation system according to claim 1, wherein when the appropriateness criterion is not satisfied, the instructions further cause the one or more processors to generate another input plan by performing an optimization calculation using another second input data.

4. The generation system according to claim 1, wherein the instructions further cause the one or more processors to:

refer, the third input data including equipment data of each of the equipment;

perform a trial calculation of a load factor of each of the equipment using the processing plan and the third input data when performing the processing plan; and determine whether the appropriateness criterion is satisfied for the processing plan based on the load factors.

5. The generation system according to claim 4, wherein when a result of the trial calculation indicates that the processing plan is inappropriate, the instructions further cause the one or more processors to generate another processing plan by performing the optimization calculation using another first input data or another constraint condition.

6. A computer-implemented method executed by one or more processors for generating a production plan for producing products of a plurality of product types by a plurality of processes using a plurality of production lines the production lines including a series of processes for processing workpieces along a plurality of processing routes, with the workpieces being transferred between the processes and between the production lines, a plurality of equipment being used in the processes, the computer-implemented method comprising:

performing an optimization calculation to generate a processing plan using first input data, the first input data including a production plan amount of each of the product types and a processing capacity of each equipment, the optimization calculation comprising an objective function including an objective of minimize a number of transfers between the production lines and a constraint condition including a constraint on transfer between the production lines, the processing plan being of a production plan amount for each of the product types, each of the production lines, and each of the processes;

generating an input plan using second input data, the second input data including an input amount of the workpieces to each of the production lines for each of the product types, the second input data further including the processing routes in the processes for each of the product types, the input plan being of an input timing of the workpieces of the production lines;

determining whether an appropriateness criterion is satisfied for the processing plan and the input plan by executing, on the one or more processors, a simulation based on the processing plan and the input plan, the simulation modeling at least equipment resources, operator resources, fixture resources, shift schedules, and equipment failure and recovery; and outputting the production plan when the appropriateness criterion is satisfied, the production plan comprises the processing plan and the input plan.

7. A non-transitory computer-readable storage medium storing instructions that, when executed by one or more processors, cause the one or more processors to perform the computer-implemented method according to claim 6.

* * * * *